United States Patent
Fujitani

(12) 
(10) Patent No.: US 6,473,868 B1
(45) Date of Patent: Oct. 29, 2002

(54) DISC ARRAY CONNECTION SYSTEM, DETECTION METHOD OF MALFUNCTIONING DEVICE AND RECORDING MEDIUM HAVING CONTROL PROGRAM RECORDED THEREON

(75) Inventor: Setsuko Fujitani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/329,241

(22) Filed: Jun. 10, 1999

(30) Foreign Application Priority Data

Jun. 10, 1998 (JP) .......................................... 10-161237

(51) Int. Cl.7 ............................................... H06F 11/00
(52) U.S. Cl. ................................ 714/8; 714/7; 714/42; 714/57
(58) Field of Search ............................. 714/7, 8, 42, 57

(56) References Cited

U.S. PATENT DOCUMENTS

| | | | | |
|---|---|---|---|---|
| 5,812,754 A | * | 9/1998 | Lui et al. ....................... | 714/6 |
| 5,815,650 A | * | 9/1998 | Apperley et al. .............. | 714/42 |
| 5,913,927 A | * | 6/1999 | Nagaraj et al. ............... | 711/114 |
| 5,922,077 A | * | 7/1999 | Espy et al. ..................... | 714/4 |
| 5,991,891 A | * | 11/1999 | Hahn et al. ..................... | 714/4 |
| 6,038,618 A | * | 3/2000 | Beer ............................ | 710/18 |
| 6,055,228 A | * | 4/2000 | DeKoning et al. ........... | 370/258 |
| 6,199,175 B1 | * | 3/2001 | Inoue et al. .................. | 713/500 |
| 6,219,753 B1 | * | 4/2001 | Richardson .................. | 711/114 |
| 6,243,386 B1 | * | 6/2001 | Chan et al. .................. | 370/401 |
| 6,330,687 B1 | * | 12/2001 | Griffith ......................... | 714/11 |
| 6,338,110 B1 | * | 1/2002 | van Cruyningen .......... | 710/109 |
| 6,401,170 B1 | * | 6/2002 | Griffith et al. ............... | 711/114 |

* cited by examiner

Primary Examiner—Robert Beausoleil
Assistant Examiner—Bryce P. Bonzo
(74) Attorney, Agent, or Firm—Foley & Lardner

(57) ABSTRACT

A disc array connecting system in which a malfunctioning device can be identified easily to render it possible to shorten the time involved in identification processing. A switch circuit 12 in an FC-AL concentrator 1 interconnects an initiator host 2 and plural target disc arrays 3-1 to 3-3. A malfunction detection circuit 11 detects a malfunction occurring in a network to which are interconnected the initiator host 2 and the plural target disc arrays 3-1 to 3-3. A switch control circuit 10 control the switch circuit 12 and, as it disconnects only a malfunctioning device from the system, sequentially and individuality interconnects the target disc arrays 3-1 to 3-3 to the initiator host 2. It is possible to identify or detect a malfunctioning device from the state of connection in the switch circuit 12.

6 Claims, 17 Drawing Sheets

DISC ARRAY CONNECTION SYSTEM, DETECTION METHOD OF MALFUNCTIONING DEVICE AND RECORDING MEDIUM HAVING CONTROL PROGRAM RECORDED THEREON

FIELD OF THE INVENTION

This invention relates to a disc array connection system, a detection method of malfunctioning device and a recording medium having a control program recorded thereon. More particularly, it relates to a method of detecting a malfunctioning device in a connection system in which a host device and a plurality of disc array devices are interconnected by FC-AL (fiber channel-arbitrated loop).

BACKGROUND OF THE INVENTION

Up to now, the FC-AL connection is realized in this type of the system by connecting an initiator host 2 and target disc arrays 3-1 to 3-3 to a FC-AL concentrator 4, as shown in FIG. 16.

In this case, the initiator host 2 and the target disc arrays 3-1 to 3-3, respectively connected to the FC-AL concentrator 4, logically appear as if the initiator host 2 and the target disc arrays 3-1 to 3-3 constitute a loop, rather than being connected in one-to-one correspondence.

If, in the above-described system, a malfunction occurs in one of the target disc arrays 3-1 to 3-3 constituting the loop, it may appear as if the malfunction has occurred in all of the devices.

SUMMARY OF THE DISCLOSURE

The following problems have been encountered in the course of the investigations toward the present invention.

If, in the above-described conventional disc array connection system, an malfunction has occurred in any one of plural disc array devices constituting the FC-AL loop, it may appear as if the malfunction has occurred in the totality of devices. Therefore, the hysteresis of malfunctions of the totality of devices needs to be analyzed to identify the particular device suffering from malfunctions. Therefore, the device suffering from malfunctions can be identified only with considerable difficulties by a time-consuming operation.

Accordingly, it is an object of the present invention to provide a disc array connection system, a method of detecting a malfunctioning device and a recording medium having control program recorded thereon, in which the device suffering from malfunctions can be identified easily in a shorter time.

In a first aspect of the present invention there is provided a disc array connecting system in which a host device and a plurality of disc array devices are connected to a concentrator to interconnect the host device and the disc array devices in a loop logically. The concentrator includes switching circuit which interconnects the host device and the plural disc array devices and a controller which controls the switch circuit so that, on occurrence of a malfunction, only the disc array devices other than the malfunctioning device will be connected to the host device.

According to a second aspect of the present invention, there is provided a method of detecting a malfunctioning device in a disc array connecting system in which a host device and a plurality of disc array devices are connected to a concentrator to interconnect the host device and the disc array devices in a loop logically. The concentrator includes a step of controlling the switching circuit adapted to interconnect the host device and the disc array devices on malfunction occurrence so that only the disc array devices other than the malfunctioning device will be connected to the host device.

In a third aspect of the present invention, there is provided a computer readable program product which comprises a malfunctioning device detection control program. The program is adapted to cause the concentrator to detect a malfunctioning device, in a disc array connecting system in which a host device and a plurality of disc array devices are connected to a concentrator to interconnect the host device and the disc array devices in a loop logically. The malfunctioning device detection control program causes the concentrator to control the switch means adapted to interconnect the host device and the disc array devices on malfunction occurrence so that only the disc array devices other than the malfunctioning device will be connected to the host device.

The program product may be carried by any medium (static or dynamic and may be in the form of e.g., a carrier wave-medium) in a fashion readable by a computer. The medium may be a recording medium.

Specifically, with the disc array connecting system according to the present invention, a switch circuit for interconnecting an initiator host and a plurality of target disc arrays is provided in an FC-AL concentrator 1. On occurrence of a malfunction, an FC-AL loop is transiently disconnected by changing over a switch in the concentrator in the loop. The initiator host 2 and the disc array devices are sequentially interconnected one-by-one for investigation in order to identify a malfunctioning device. The device thus identified is disconnected from the loop to constitute the loop by the remaining devices.

This enables a malfunctioning device to be identified easily, while enabling shortening of the time involved in the identification processing. By changing over the switch connected to the malfunctioning device to disconnect the malfunctioning device automatically from the loop, input/output to the devices other than the malfunctioning device can be continued without affecting these other devices.

PREFERRED EMBODIMENTS OF THE INVENTION

Figure 1:
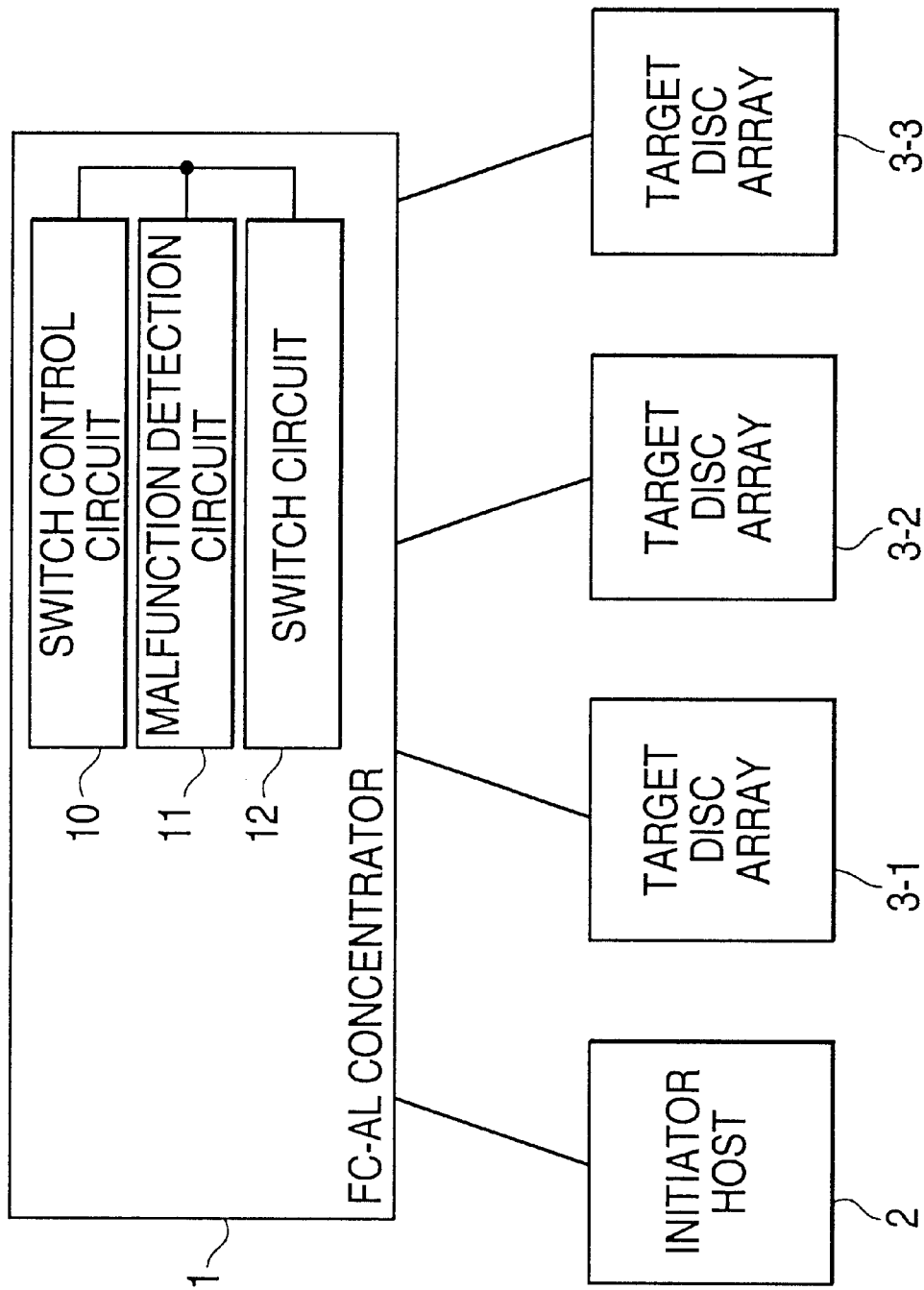
FIG. 1 is a block diagram showing the structure of the disc array connection system according to an embodiment of the present invention.
Figure 17:
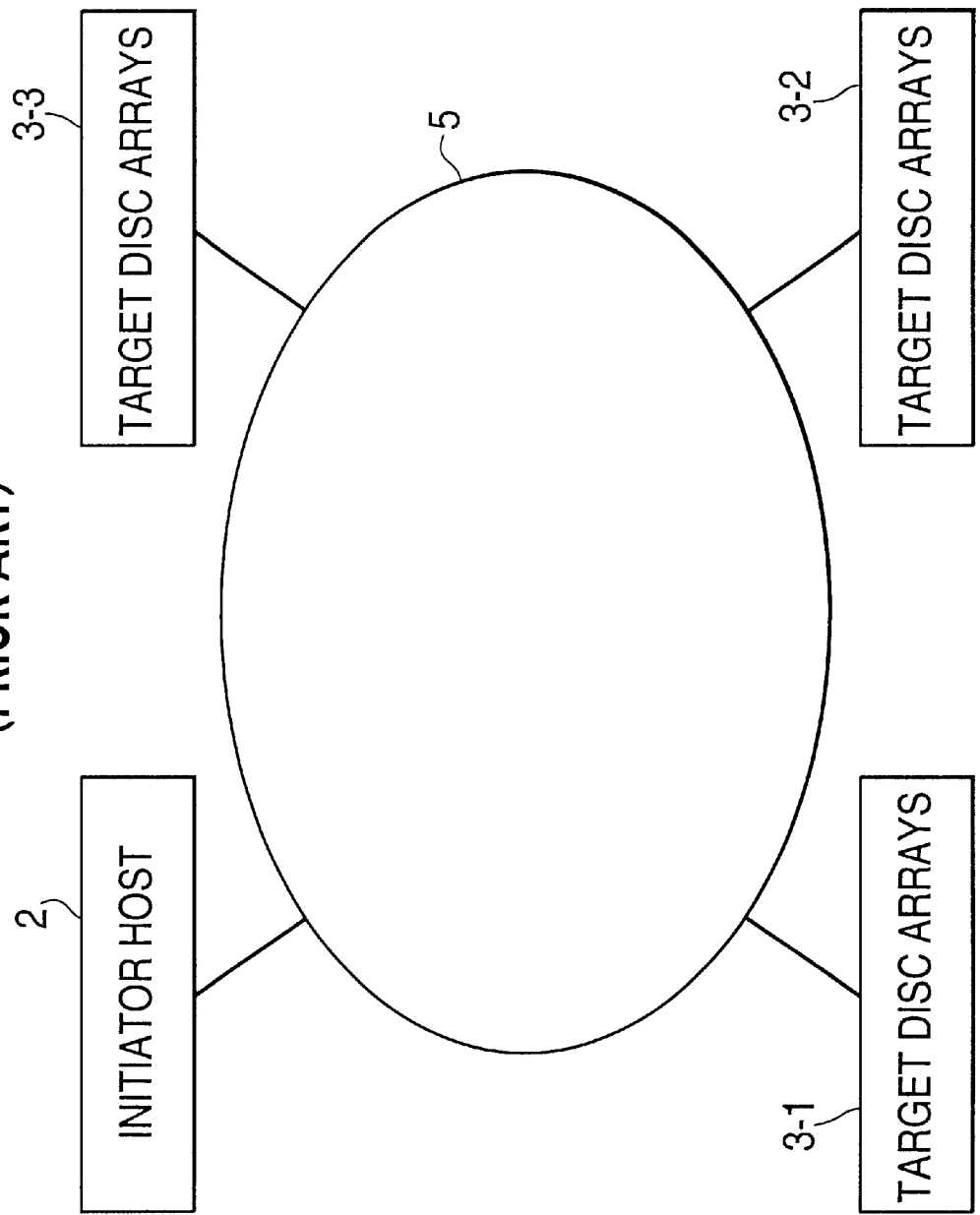
FIG. 17 shows an illustrative physical structure of a disc array connection system in a conventional disc array connecting system.

Referring to the drawings, an embodiment of the present invention will be explained. FIG. 1 is a block diagram showing the structure of a disc array connecting system according to the present embodiment of the present invention. The disc array connecting system embodying the present invention realizes the FC-AL connection by interconnecting the initiator host 2 and plural target disc arrays 3-1 to 3-3 to the FC-AL concentrator 1. It is noted that the initiator host 2 and the plural target disc arrays 3-1 to 3-3 constitute a loop as shown in FIG. 17 to permit the input/output processing.

The FC-AL concentrator 1 includes a switch circuit 12 for interconnecting the initiator host 2 and the plural target disc arrays 3-1 to 3-3, a malfunction detection circuit 11 for detecting the malfunction in a network to which are connected the initiator host 2 and the plural target disc arrays 3-1 to 3-3, and a switch control circuit 10 for controlling the switch circuit 12.

Figure 2:
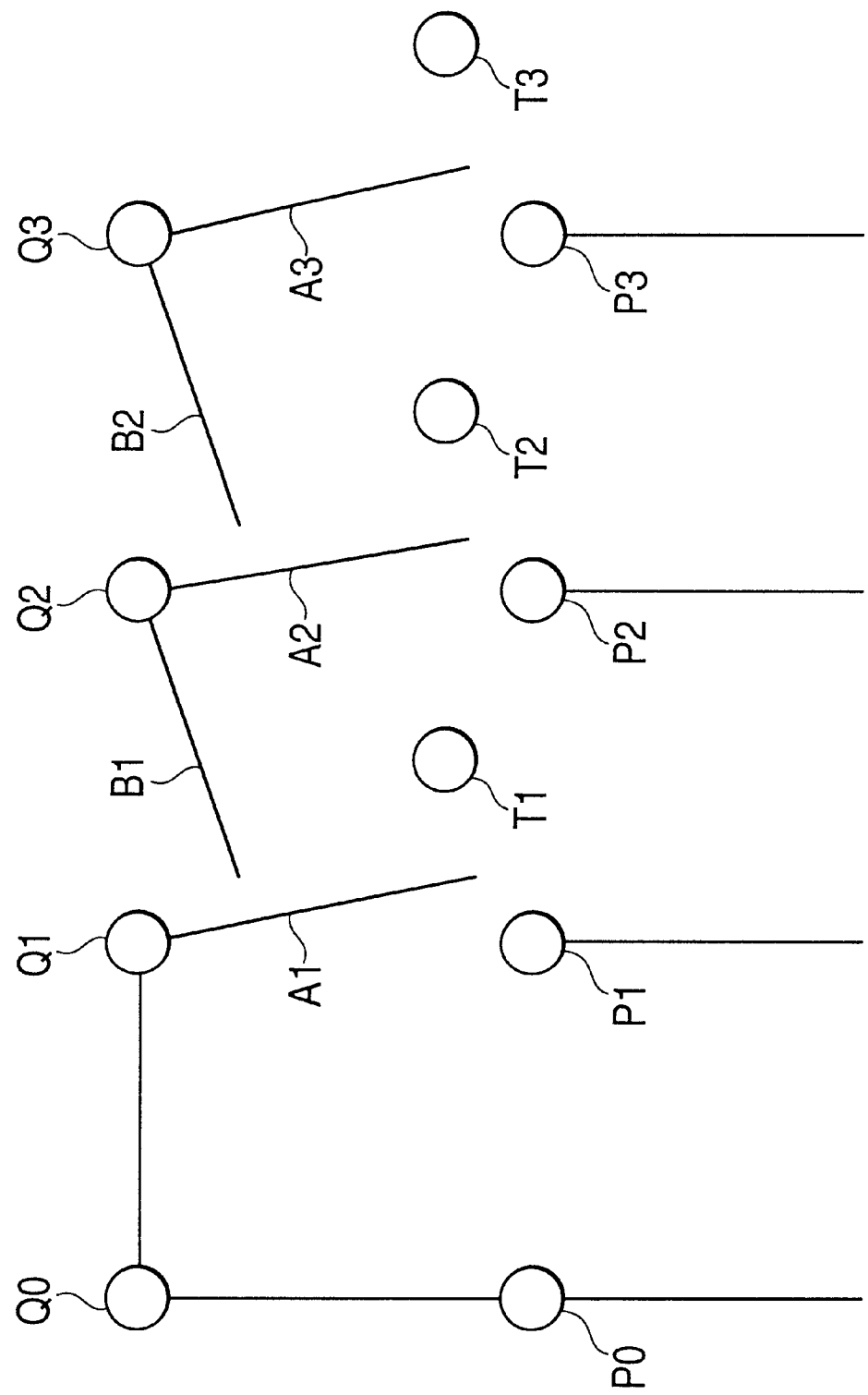
FIG. 2 shows an illustrative structure of a switch circuit of FIG. 1
Figure 11:
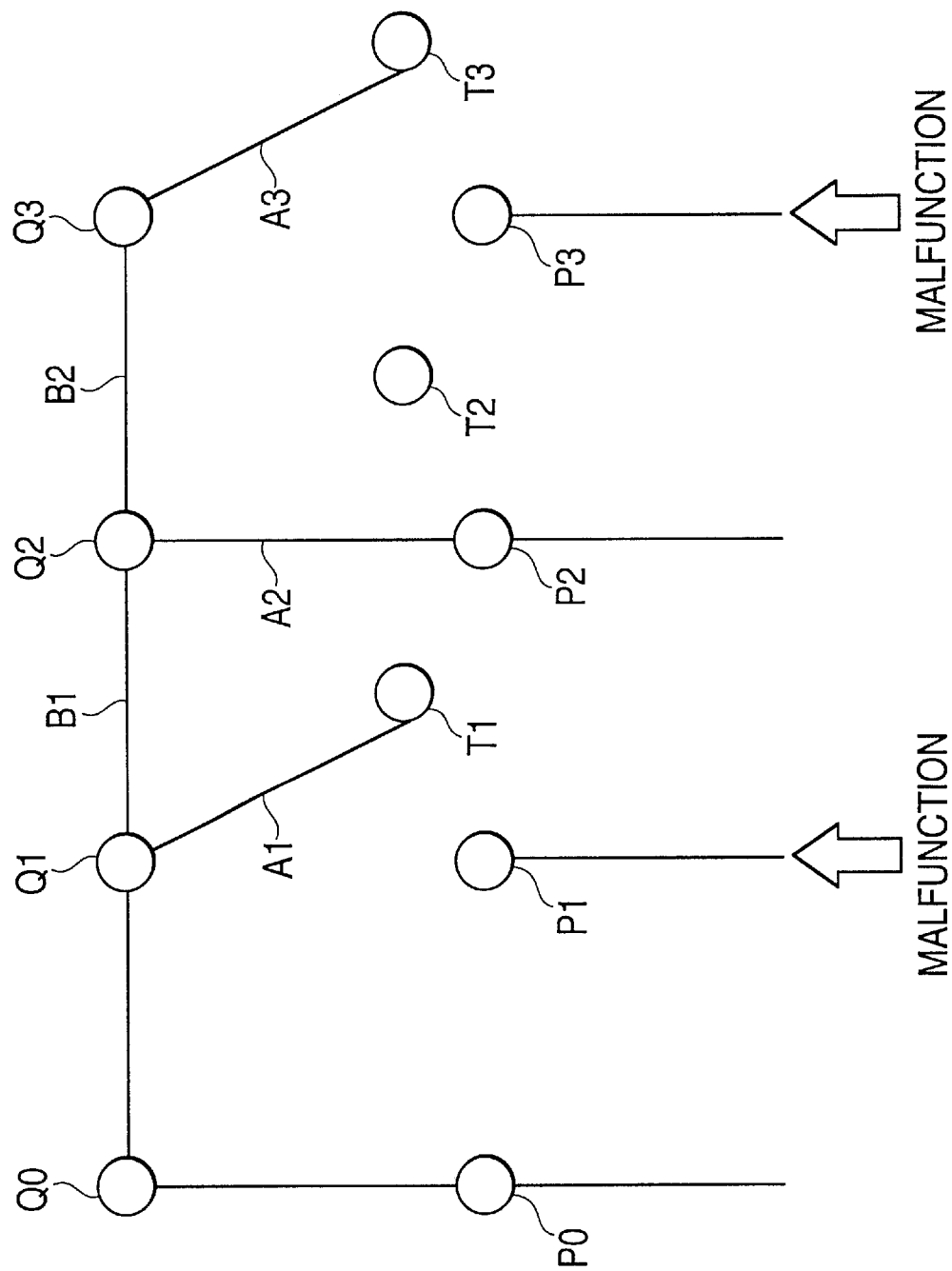
FIG. 11 shows a further connecting operation in the switch circuit of FIG. 2.

FIG. 2 shows an illustrative structure of the switch circuit 12 shown in FIG. 11. In FIG. 2, the switch circuit 12 includes switches A1 to A3, B1, B2 and terminals P0 to P3, Q0 to Q3 and T1 to T3.

It is assumed that the initiator host 2, the target disc array 3-1, the target disc array 3-2 and the target disc array 3-3 are connected to terminals P0, P1, P2 and P3 of the switch circuit 12, respectively.

Figure 3:
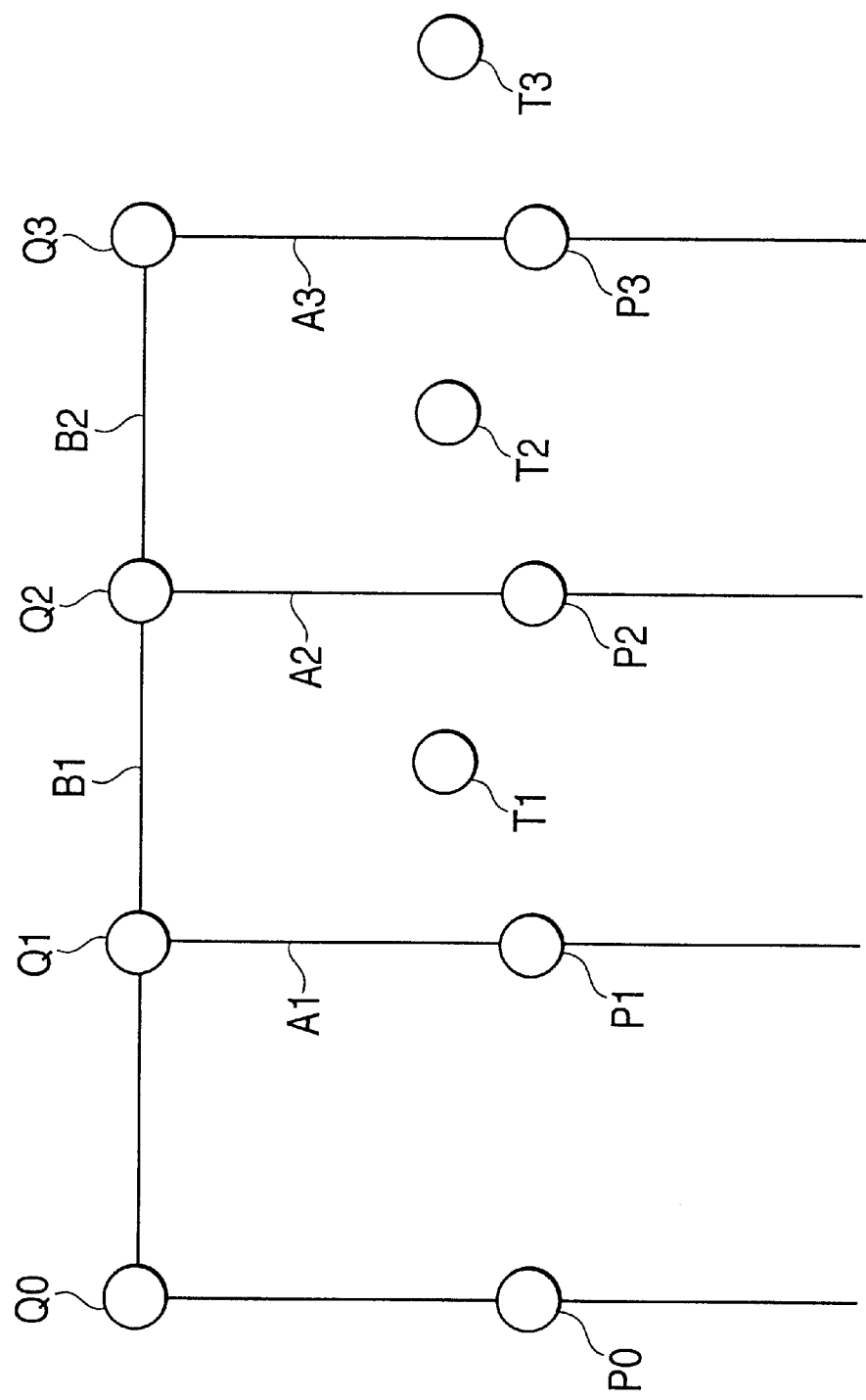
FIG. 3 a connecting operation in the switching circuit of FIG. 2.
Figure 14:
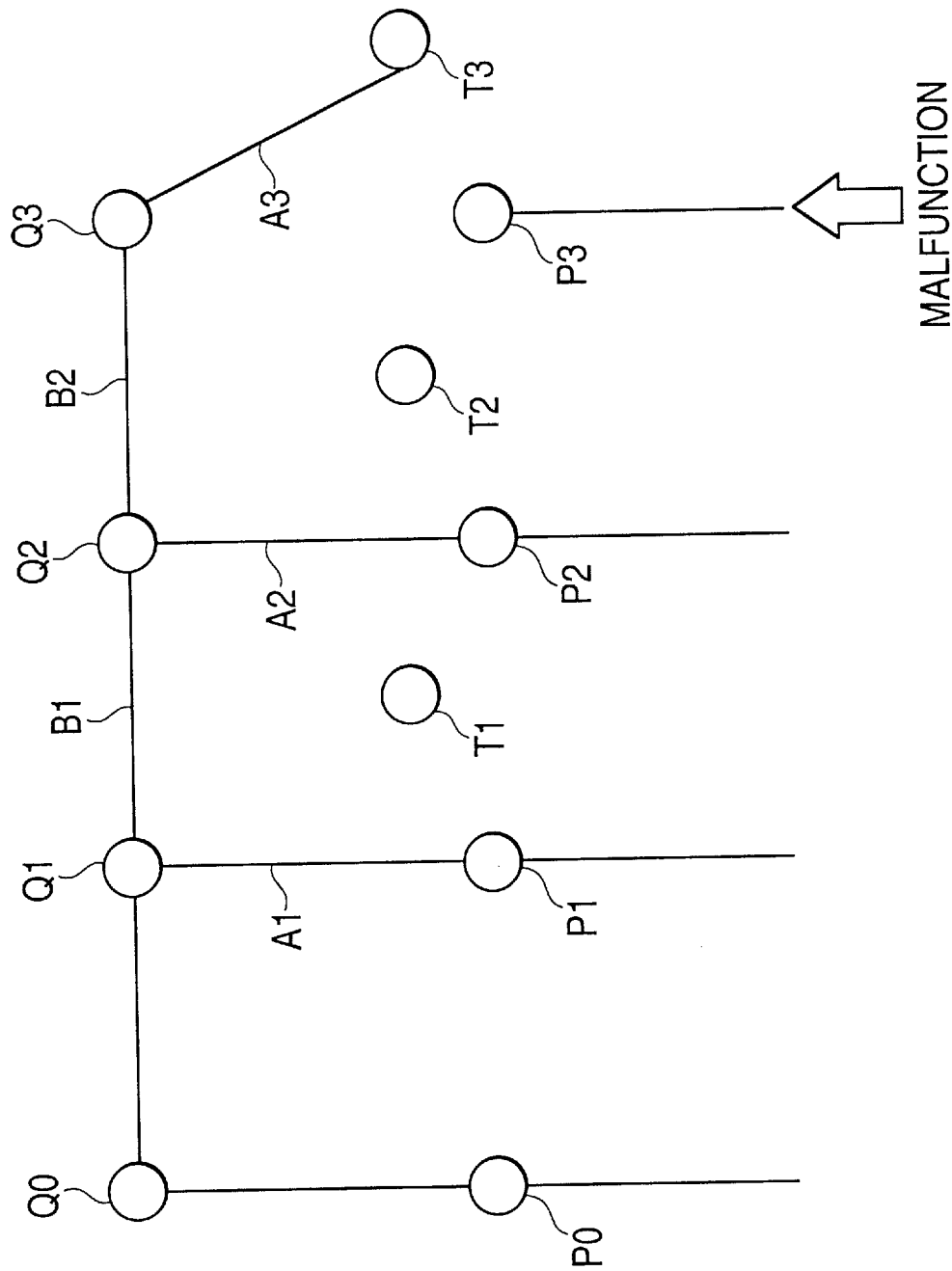
FIG. 14 shows a further connecting operation in the switch circuit of FIG. 2.
Figure 15:
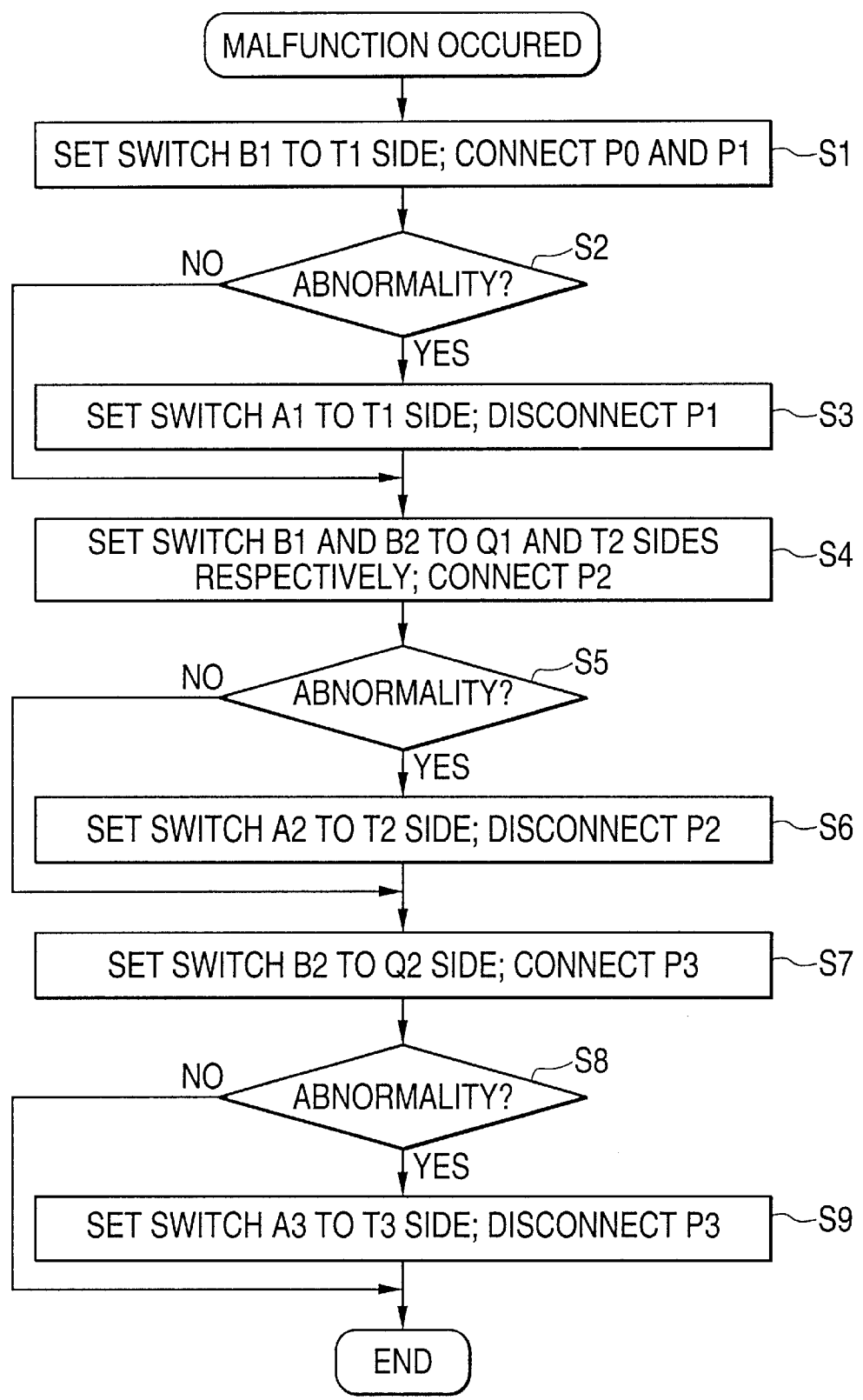
FIG. 15 is a flowchart showing the detection processing of a malfunctioning device in a switch circuit of FIG. 1.
Figure 16:
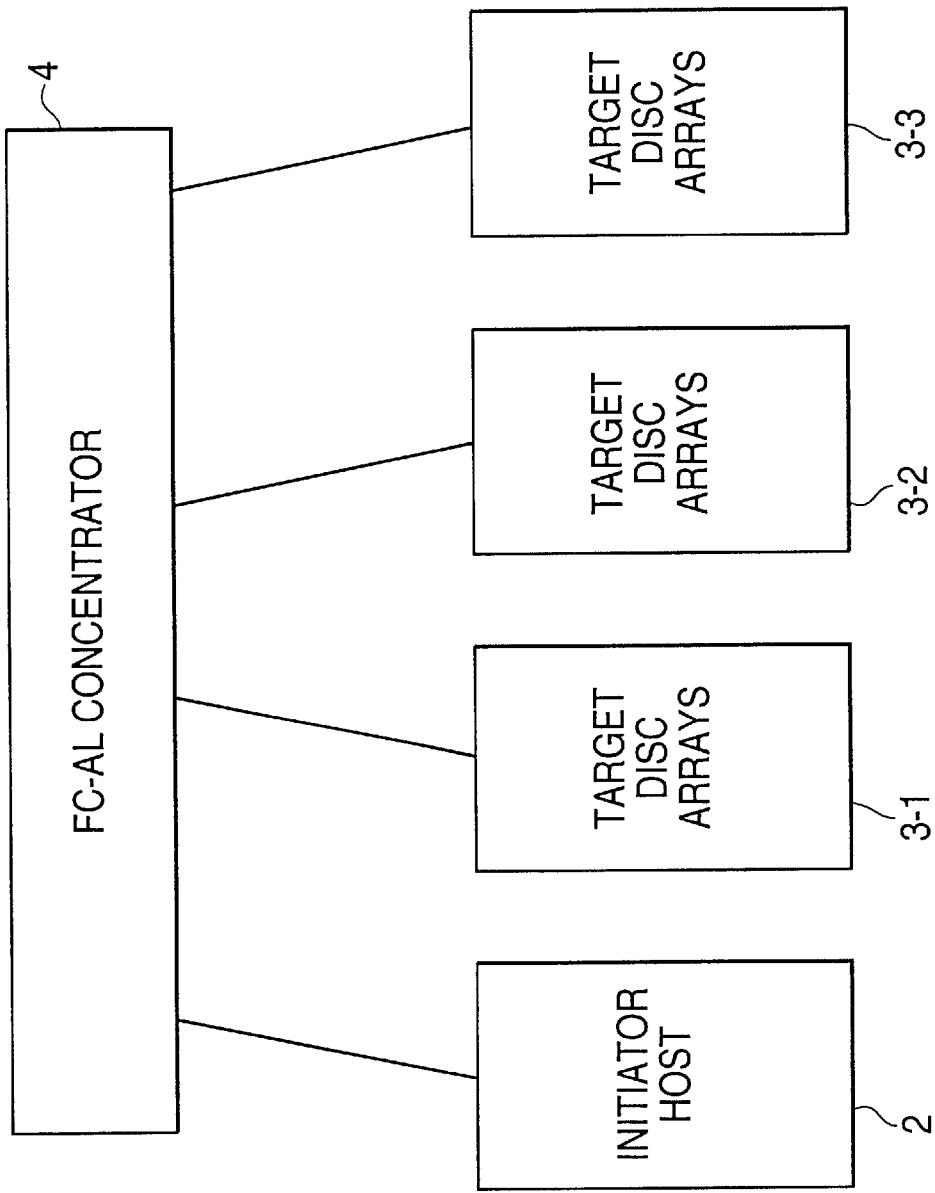
FIG. 16 is a block, diagram showing an illustrative physical structure of a disc array connection system in a conventional disc array connecting system.

FIGS. 3 and 14 show the connection operation in the switch circuit 12, and FIG. 15 is a flowchart showing the detection processing of the malfunctioning device in the switch control circuit 10 of FIG. 1. It is noted that the processing operation shown in FIG. 15 is realized by the switch control circuit 10 executing the program stored in a control memory, not shown, and that a read-only memory (ROM) or an integrated circuit (IC) can be used as a control memory. The switch control circuit 10 and the control memory can also be realized by firmware.

The method for detection of the malfunctioning device embodying the present invention is explained with reference to FIGS. 1 to 15.

In the FC-AL concentrator 1, it is possible to realize the FC-AL loop interconnection (see FIG. 3), one-to-one interconnection (see FIGS. 4, 5, 9, 11 and 12) or one-to-two interconnection (see FIGS. 6 to 8 and 14) between the initiator host 2 and specified devices.

If, when the switch A1 interconnects the terminals P1 and Q1, the switch A2 interconnects the terminals P2 and Q2, the switch A3 interconnects the terminals P3 and Q3, the switch B1 interconnects the terminals Q1 and Q2 and the switch B2 interconnects the terminals Q2 and Q3, to interconnect the initiator host 2 and the target disc arrays 3-1 to 3-3, a malfunction occurs, the device where the malfunction has occurred is located under control by the switch control circuit 10.

Figure 4:
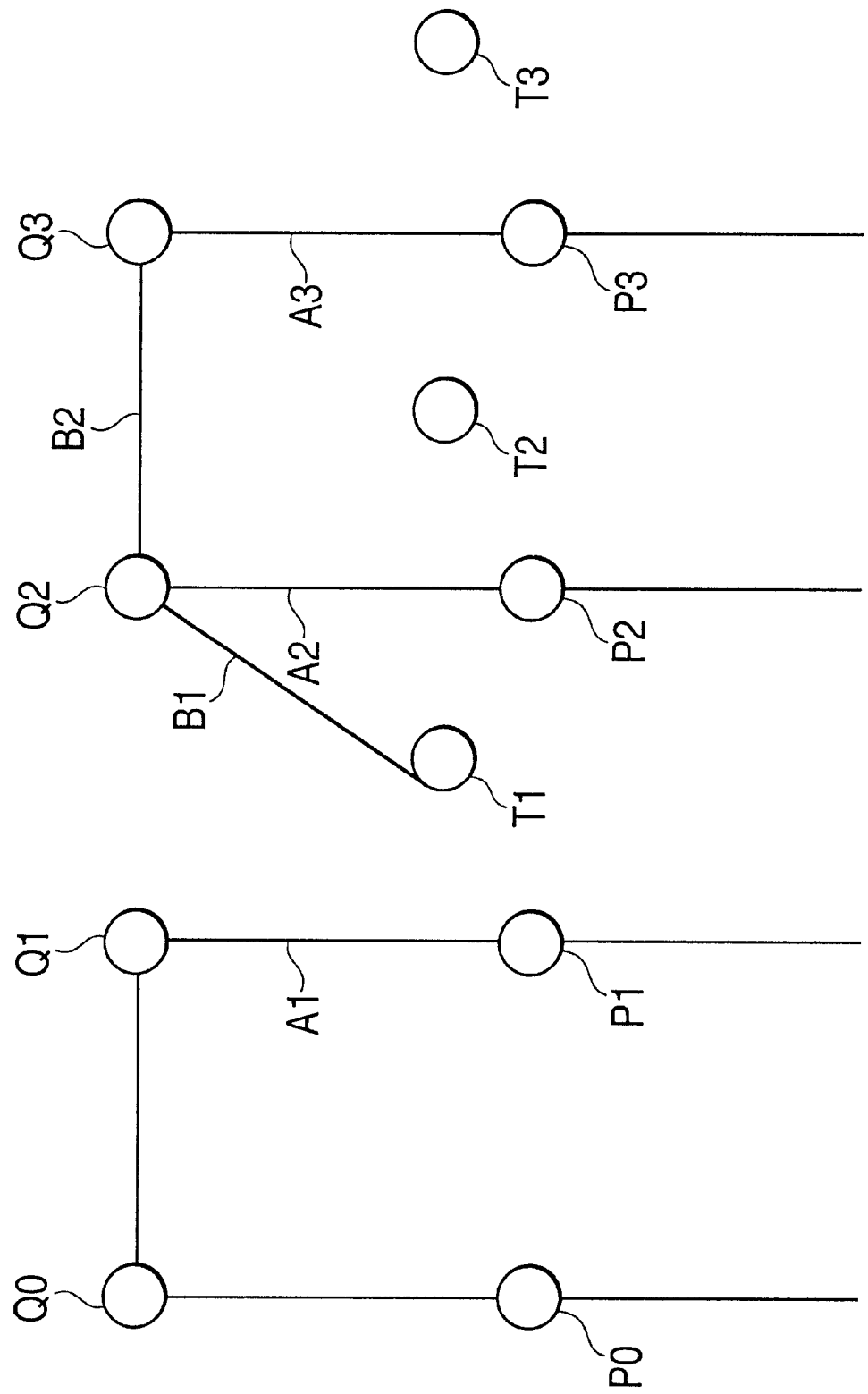
FIG. 4 shows another connecting operation in the switch circuit of FIG. 2.

If the malfunction detection circuit 11 detects the occurrence of malfunctions due to, for example, absence of response, the switch control circuit 10 sets the switch B1 to the side of the terminal T1 to switch from the state of FC-AL loop interconnection between the initiator host 2 and the target disc arrays 3-1 to 3-3 to the state of interconnection between the terminals P0 and P1 only, as shown in FIG. 4 (step S1 in FIG. 15).

If, in this state, abnormality occurs in an input/output (step S2 in FIG. 15), the switch control circuit 10 sets the switch A1 to the side of the terminal T1 to disconnect the input/output to the terminal P1 (step S3 of FIG. 15). Conversely, if there is no abnormality in the input/output (step S2 in FIG. 15), the switch control circuit 10 keeps the switch A1 connected to the terminal P1.

Figure 5:
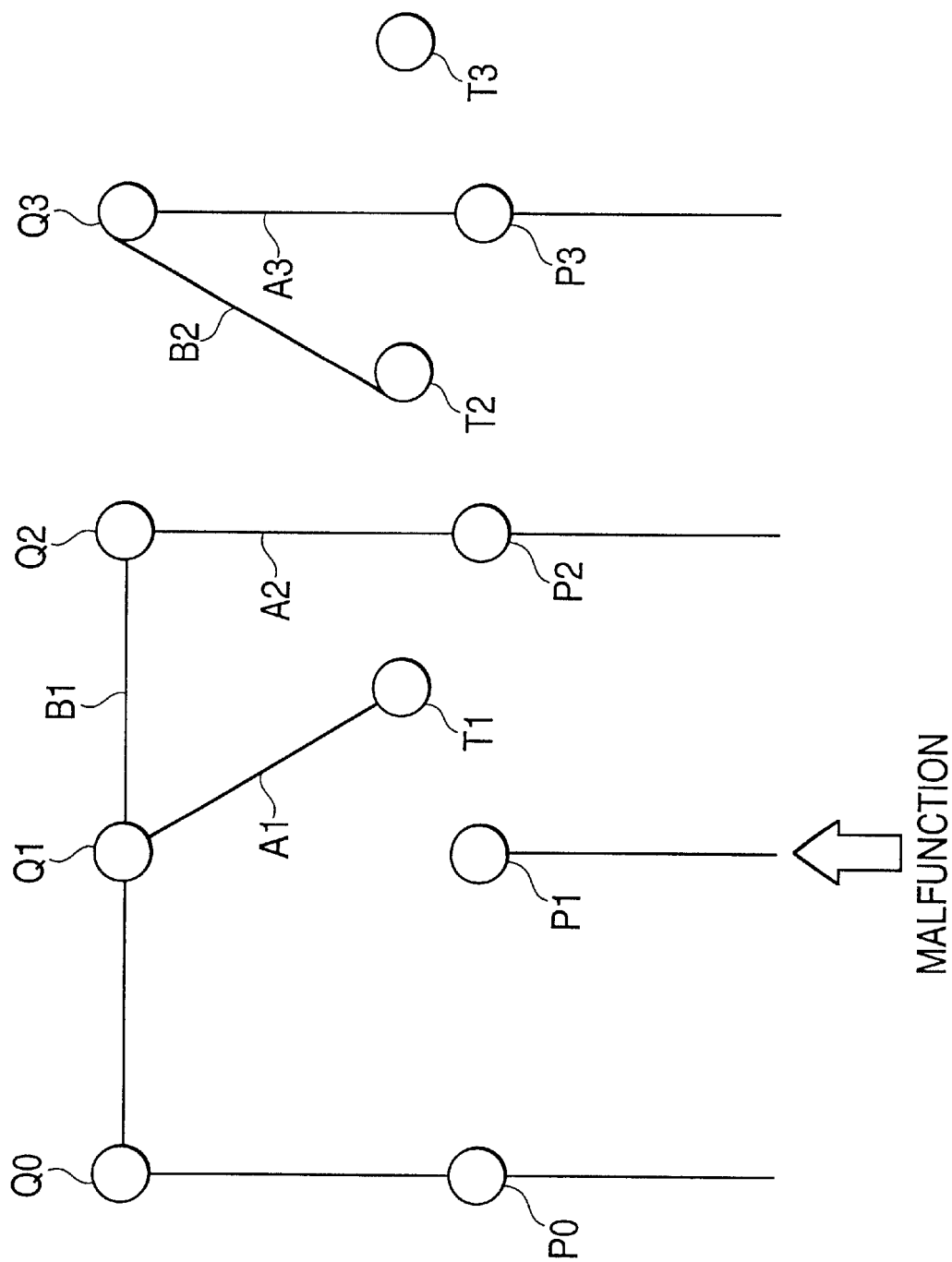
FIG. 5 shows a further connecting operation in the switch circuit of FIG. 2.
Figure 6:
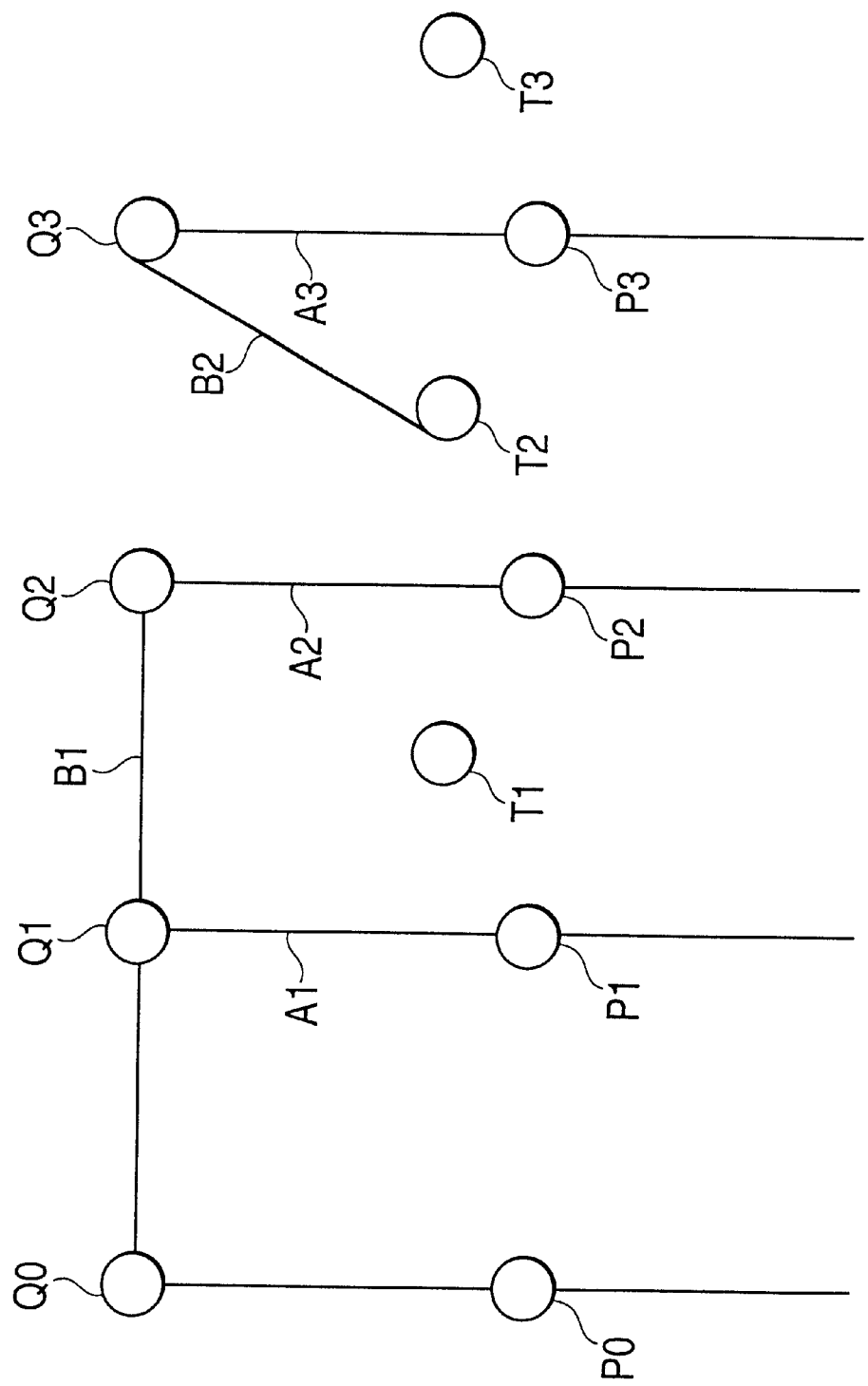
FIG. 6 shows a further connecting operation in the switch circuit of FIG. 2.

The switch control circuit 10 then sets the switches B1 and B2 to the side of the terminal Q1 and to the side of the terminal T2, respectively, while connecting the terminal P2 to the terminal P0, as shown in FIGS. 5 and 6 (step S4 in FIG. 15). If, in this case, the terminal P1 is malfunctioning, the switch A1 is connected to the terminal T1, as shown in FIG. 5 and, if otherwise, the switch A1 is connected to the terminal P1, as shown in FIG. 6.

If malfunction occurs in this state (step S5 of FIG. 15), the switch control circuit 10 causes the switch A2 to be set to the side of the terminal T2 to disconnect the input/output to the terminal P1 (step S6 of FIG. 15).

Figure 7:
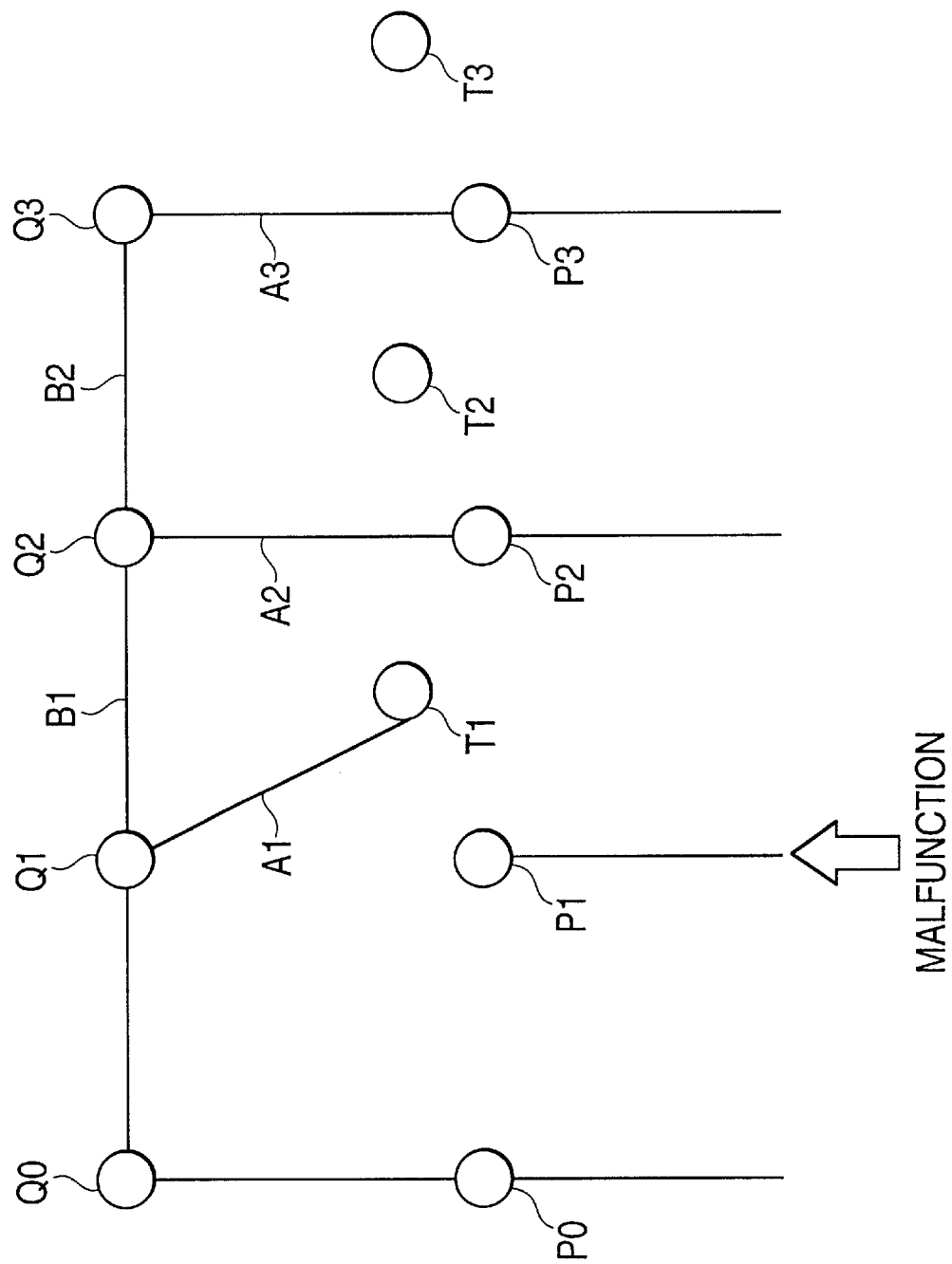
FIG. 7 shows a further connecting operation in the switch circuit of FIG. 2.
Figure 8:
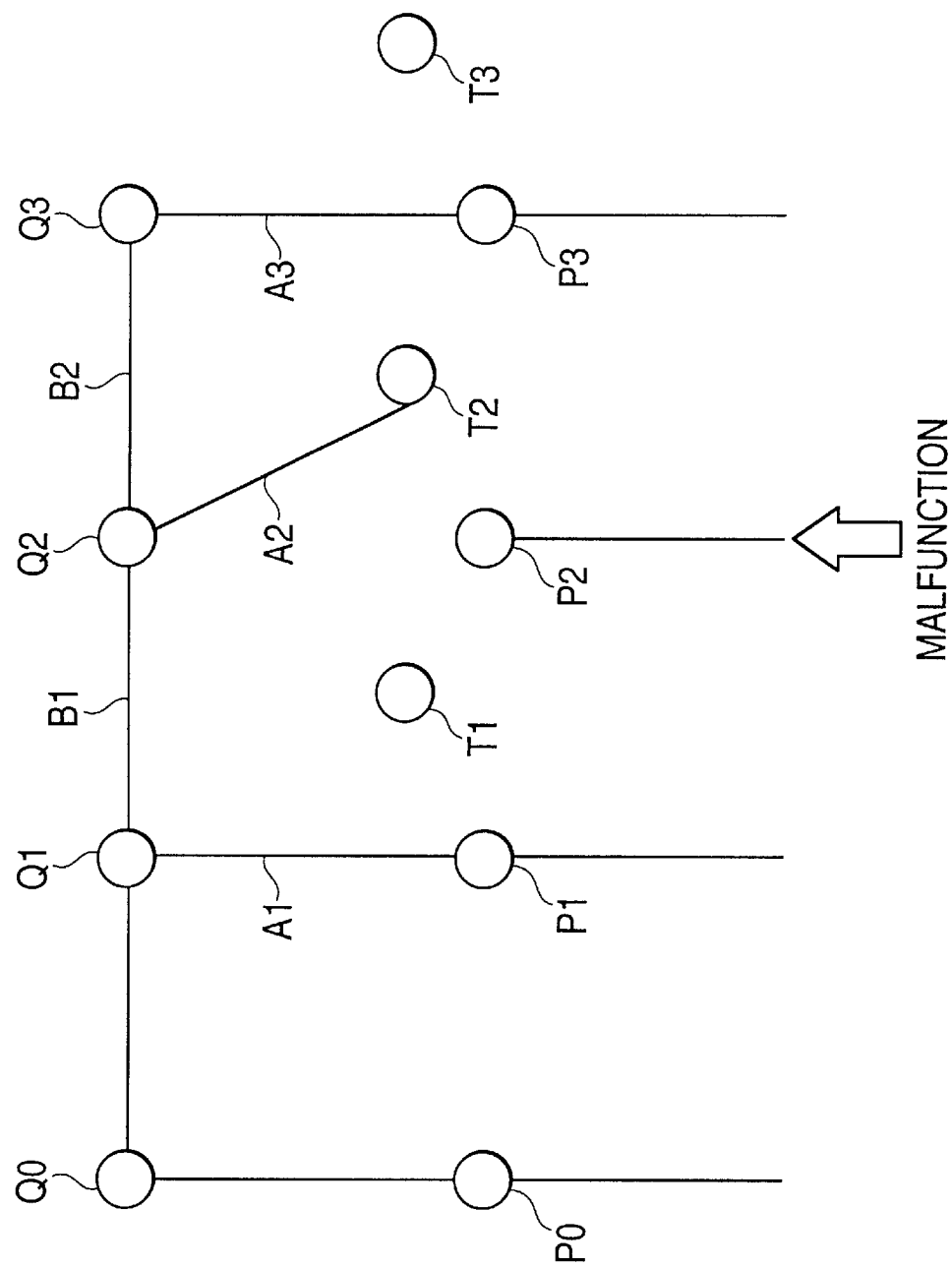
FIG. 8 shows a further connecting operation in the switch circuit of FIG. 2.

The switch control circuit 10 then causes the switch B2 to be set to the side of the terminal Q2, while connecting the terminal P3 to be connected to the terminal P0, as shown in FIGS. 7 and 8 (step S7 in FIG. 15). If, in this case, there is a malfunction the terminal Picture data input unit 1, the switch A1 remains connected to the terminal T1, as shown in FIG. 7, whereas, if there is a malfunction in the terminal P2, the switch A2 remains connected to the terminal T2, as shown in FIG. 8.

Figure 9:
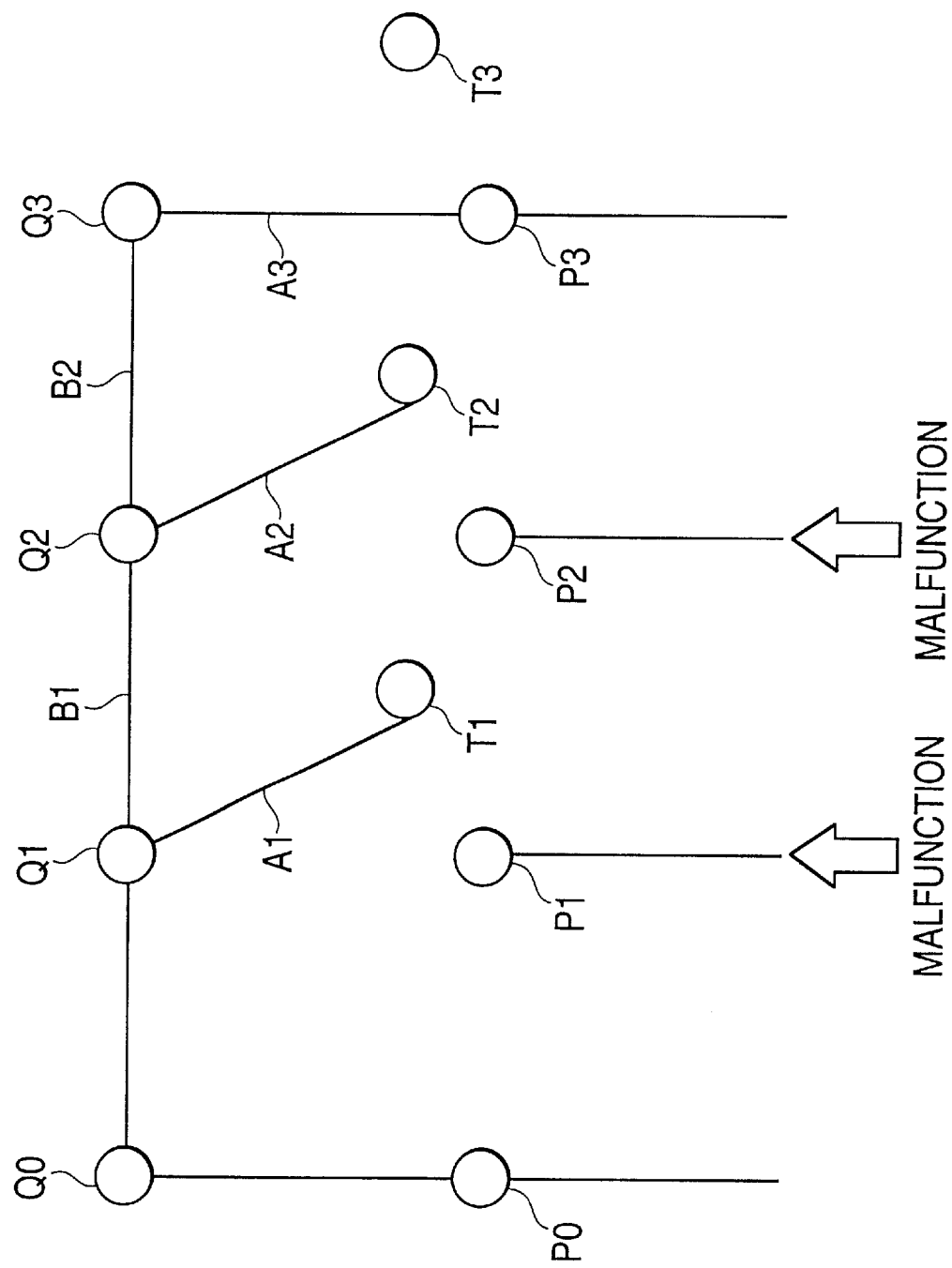
FIG. 9 shows a further connecting operation in the switch circuit of FIG. 2.
Figure 10:
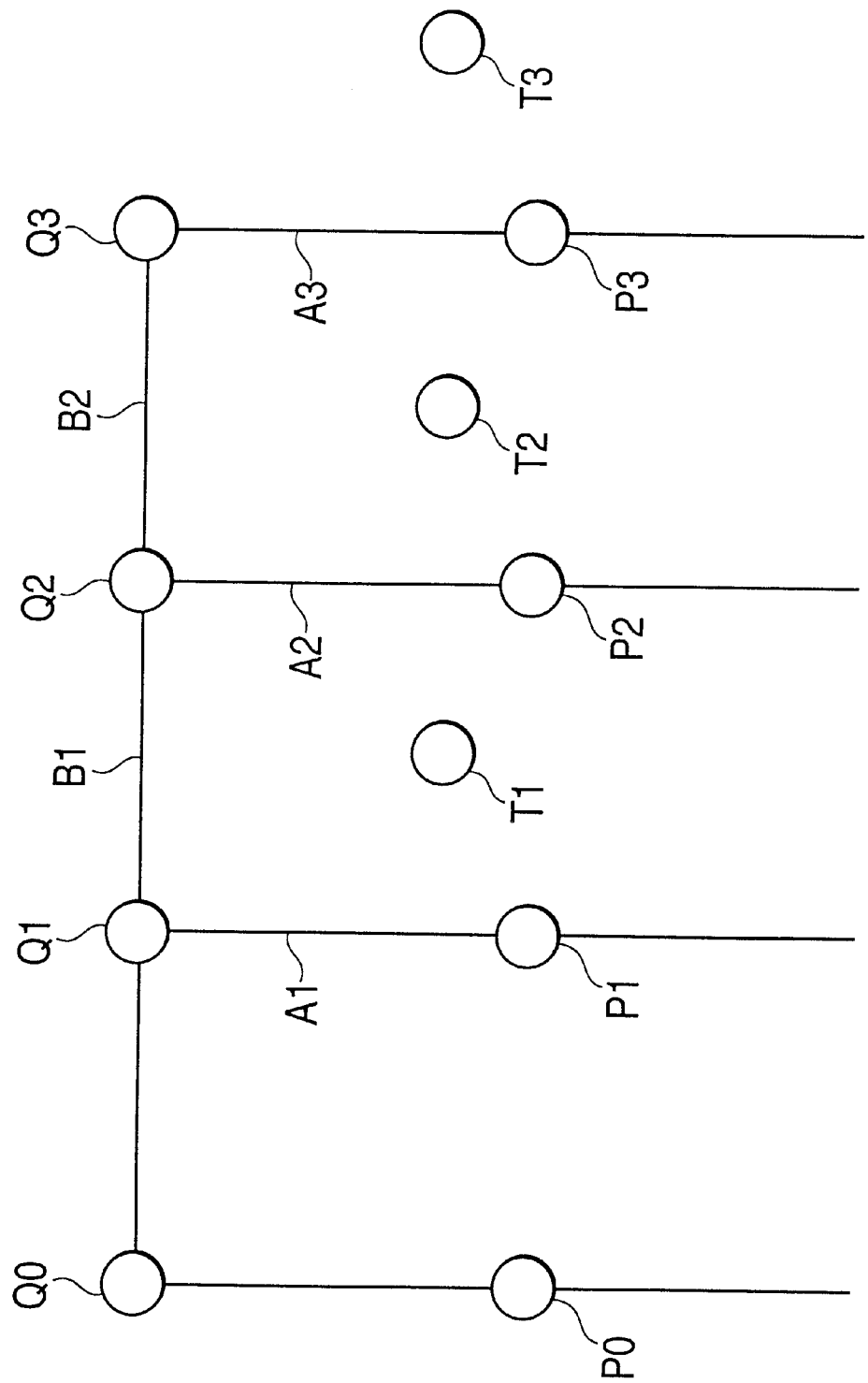
FIG. 10 shows a further connecting operation in the switch circuit of FIG. 2.

If both the terminals P1 and P2 are malfunctioning, the switch A1 is connected to the terminal T1, while the switch A2 is connected to the terminal T2, as shown in FIG. 9. If neither the terminal P1 nor the terminal P2 is malfunctioning, the switches A1, A2, A3, B1 and B2 are connected to the terminals P1, P2, P3, Q1 and Q2, respectively (as shown in FIG. 10).

If there is a malfunction in the input/output in any of the above-mentioned states (step S8 in FIG. 15), the switch control circuit 10 causes the switch A3 to be set to the side of the terminal T3, while disconnecting the input/output to the terminal P3 (step S9 of FIG. 15).

Figure 12:
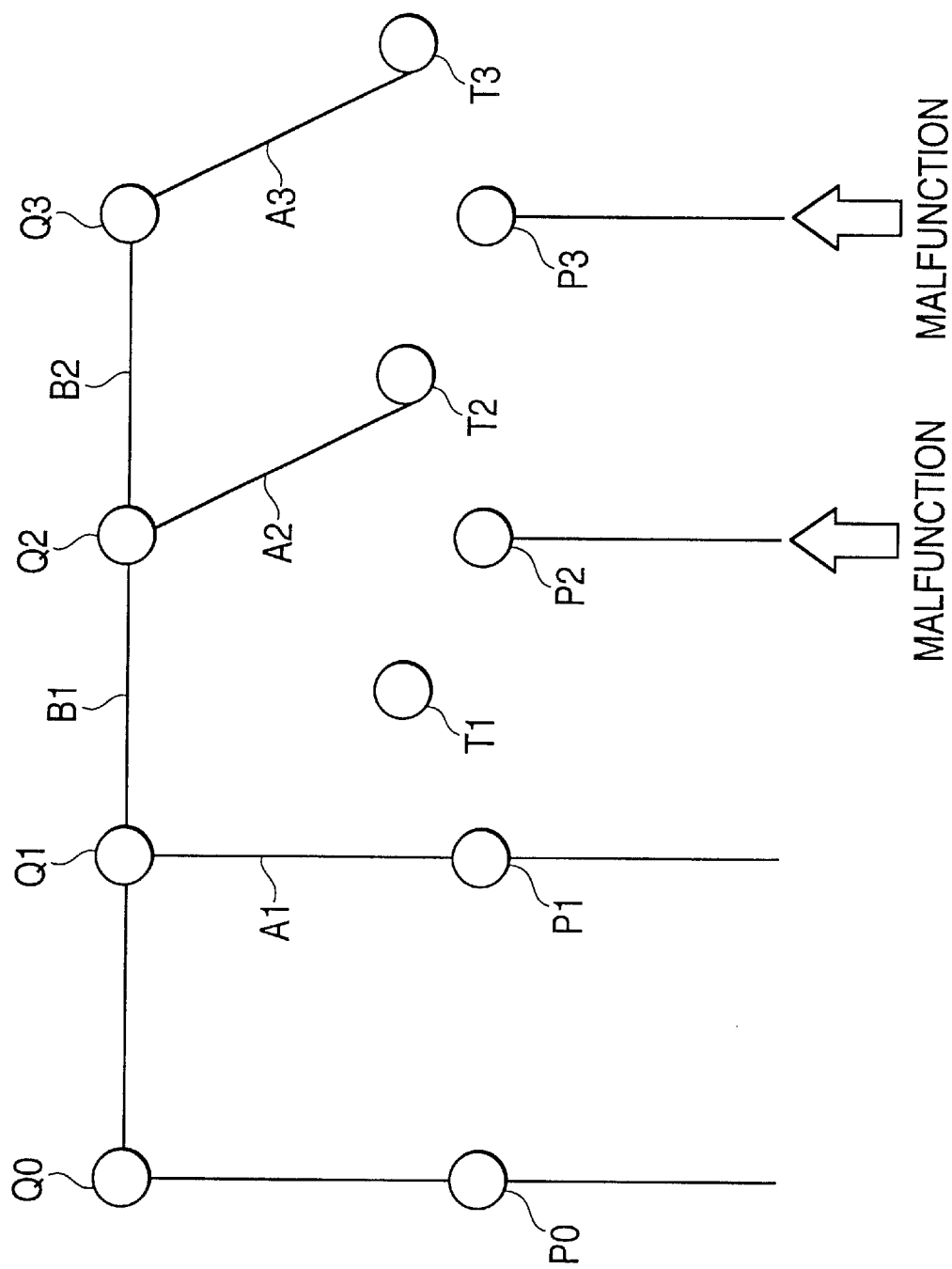
FIG. 12 shows a further connecting operation in the switch circuit of FIG. 2.

If, at this time point, the terminals P1, P3 are both malfunctioning, the switches A1, A2 and A3 are connected to the terminals T1, P2 and T3, respectively, as shown in FIG. 11. If the terminals P2, P3 are malfunctioning, the switches A1, A2 and A3 are connected to the terminals P1, T2 and T3, respectively, as shown in FIG. 12.

Figure 13:
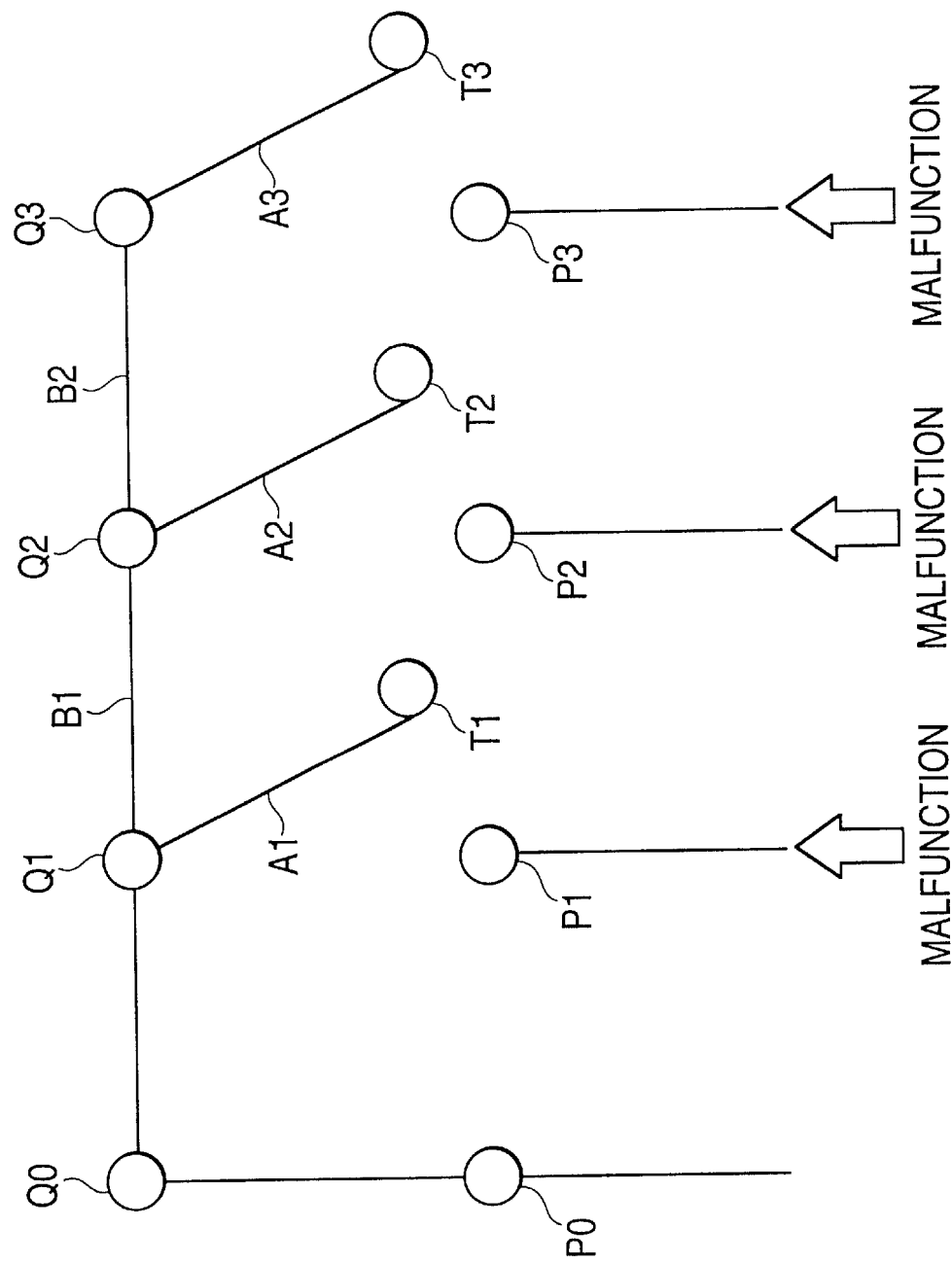
FIG. 13 shows a further connecting operation in the switch circuit of FIG. 2.

If the terminals P1, P2 and P3 are all malfunctioning, the switches A1, A2 and A3 are connected to the terminals T1, T2 and T3, respectively, as shown in FIG. 13, whereas, if only the terminal P3 is malfunctioning, the switch A1 is connected to the terminal P1, while the switches A2 and A3 are connected to the terminals P2 and T3, respectively, as shown in FIG. 14.

Thus, by deciphering to which terminals the switches A1 to A3, B1 and B2 are connected after the switch control circuit 10 has performed the above control operation, it is possible to identify or detect which of the devices is malfunctioning.

Although three target disc arrays 3-1 to 3-3 are connected to the sole initiator host 2 in the above-described embodiment of the present invention, the present invention can be applied to a structure in which m peripheral devices are connected to n initiator hosts. That is, by providing the above-mentioned switch control circuit 10, malfunction detection circuit 11 and the switch circuit 12 in all ports of the FC-AL concentrator 1, and by controlling the switch circuit 12 in the same way as in the above-described processing flow, it is possible to identify the malfunctioning device. Should there be plural initiator hosts, the above-described processing flow is executed for all of the initiator hosts to identify the malfunctioning device.

By providing the switch circuit 12 in the FC-AL concentrator 1, and by changing over the switches A1 to A3, B1 and B2 of the switch circuit 12, to identify the malfunctioning device, manual search to be effected for the totality of the devices connected to the FC-AL concentrator 1 loop may be dispensed with and hence the number of process steps required for identifying the malfunctioning device is reduced drastically, thus shortening the time required for the identification.

In addition, by changing over the switches A1 to A3, B1 and B2 connected to the malfunctioning device, and by automatically disconnecting the malfunctioning device from the FC-AL loop, the input/output to other devices connected to the loop than the malfunctioning device can be continued without affecting these other devices.

The meritorious effect of the present invention are summarized as follows.

According to the present invention, as described above, in which, in a disc array system adapted for logically loop-connecting a host device and plural disc array devices by connecting the host device and the disc array devices to a concentrator, a switch circuit interconnecting the host device and the plural disc array devices is controlled by a concentrator so that only the disc array devices other than the malfunctioning disc array device will be connected to the host device, the malfunctioning disc array device can be identified easily to reduce the time involved in the processing for identification.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A disc array connecting system in which a host device and a plurality of disc array devices are connected to a concentrator to interconnect the host device and the disc array devices in a loop logically, wherein said concentrator includes a switching circuit which interconnects said host device and said plural disc array devices, and a controller which controls said switch circuit so that, on occurrence of a malfunction, the switch circuit sequentially connects each of said disc array devices to said host to identify malfunctioning disc array devices, and disconnects any identified malfunctioning disc array devices from the host.

2. The disc array connecting system according to claim 1 wherein said controller causes said switch to disconnect said identified malfunctioning device from the loop connection and to logically loop-connect remaining devices to said host device.

3. A method of detecting a malfunctioning device in a disc array connecting system in which a host device and a plurality of disc array devices are connected to a concentrator to interconnect the host device and the disc array devices in a loop logically, wherein the method comprises:

providing a switching circuit adapted to interconnect/disconnect said host device and the disc array devices; and controlling said switching circuit upon occurrence of a malfunction to sequentially connect each of said disc array devices to said host to identify malfunctioning disc array devices, and to disconnect any identified malfunctioning disc array devices from the host.

4. The malfunctioning device detection method according to claim 3, wherein the switch disconnects said malfunctioning device from said loop connection such that remaining devices are interconnected in a logical loop to said host device.

5. For use in a disc array connecting system in which a host device and a plurality of disc array devices are connected to a concentrator to interconnect the host device and the disc array devices in a loop logically, a computer readable medium storing a malfunctioning device detection control program adapted to cause the concentrator to detect a malfunctioning device, wherein said malfunctioning device detection control program comprises causing said concentrator to control a switch circuit to sequentially connect each of said disc array devices to said host to identify malfunctioning disc array devices, and to disconnect any identified malfunctioning disc array devices from the host.

6. The program product according to claim 5 wherein said malfunctioning device detection control program connects only the devices other than the malfunctioning device to said host device, so that the devices other than the malfunctioning device are connected in a logical loop to said host device.

* * * * *